US012439421B2

(12) United States Patent
Gad et al.

(10) Patent No.: US 12,439,421 B2
(45) Date of Patent: Oct. 7, 2025

(54) PACKET DATA CONVERGENCE PROTOCOL DUPLICATION COOPERATIVE CONFIGURED GRANT

(71) Applicant: Dell Products L.P., Round Rock, TX (US)

(72) Inventors: Omar Wael Ahmed Ahmed Gad, London (GB); Yasmin ElDokany, Cairo (EG); Ramy Atawia, Kanata (CA)

(73) Assignee: DELL PRODUCTS L.P., Round Rock, TX (US)

( * ) Notice: Subject to any disclaimer, the term of this patent is extended or adjusted under 35 U.S.C. 154(b) by 423 days.

(21) Appl. No.: 18/047,464

(22) Filed: Oct. 18, 2022

(65) Prior Publication Data
US 2024/0129928 A1 Apr. 18, 2024

(51) Int. Cl.
*H04W 72/23* (2023.01)
*H04L 1/18* (2023.01)
(Continued)

(52) U.S. Cl.
CPC ............... *H04W 72/23* (2023.01); *H04L 1/18* (2013.01); *H04W 28/06* (2013.01);
(Continued)

(58) Field of Classification Search
CPC . H04W 72/23; H04W 28/06; H04W 72/0446; H04W 72/1263; H04W 80/02; H04L 1/18
See application file for complete search history.

(56) References Cited

U.S. PATENT DOCUMENTS

2021/0144743 A1 5/2021 Rastegardoost et al.
2021/0282178 A1 9/2021 Boroujeni et al.
(Continued)

FOREIGN PATENT DOCUMENTS

WO 2023/091272 A1 5/2023

OTHER PUBLICATIONS

International Search Report and Written Opinion received for PCT Application Serial No. PCT/US2023/034355 dated Jan. 24, 2024, 20 pages.
(Continued)

*Primary Examiner* — Jackie Zuniga Abad
(74) *Attorney, Agent, or Firm* — Amin, Turocy & Watson, LLP

(57) ABSTRACT

The technology described herein is directed towards cooperative configured grant with respect to the configured grant timeslots of multiple cells, particularly for ultra-reliable low latency communications (URLLC) devices configured for packet data convergence protocol (PDCP) for duplicate packet communications. Selection of slots is delay aware with respect to PDCP communications. By selecting a first serving cell's configured grant physical resource block (PRB) time slots in a timing alignment with a second cell's configured grant PRB time slots, end-to-end PDCP delay is reduced for duplicate communications between a user equipment communicating with the first cell and the second cell for PDCP duplication. Multiple UEs can be prioritized based on their current condition data with respect to slot assignment. Also described is a controller proposing a different configuration of configured grant slots, which the controller can then use if accepted by the deciding entity.

20 Claims, 14 Drawing Sheets

(51) Int. Cl.
  *H04W 28/06* (2009.01)
  *H04W 72/0446* (2023.01)
  *H04W 72/1263* (2023.01)
  *H04W 80/02* (2009.01)

(52) U.S. Cl.
  CPC ... *H04W 72/0446* (2013.01); *H04W 72/1263* (2013.01); *H04W 80/02* (2013.01)

(56) References Cited

U.S. PATENT DOCUMENTS

2022/0078697 A1* 3/2022 Tseng .................. H04W 72/21
2024/0089819 A1* 3/2024 Lunardi ............... H04W 24/10

OTHER PUBLICATIONS

Huawei, "TP for NR_IIOT BL CR for TS 38.425): Dynamic Control of UL Duplication—Activation Suggestion", R3-202325, 3GPP TSG-RAN3 Meeting #107b-e E-meeting, Apr. 20-30, 2020, 6 pages.
CMCC, "Draft—Summary of offline Discussion on Dynamic Control of Pdcp Duplication", 3GPP TSG-RAN WG3 Meeting #107-e Online, 24th Feb.-Mar. 6, 2020, 14 pages.
International Preliminary Report on Patentability received for PCT Application Serial No. PCT/US2023/034355 dated May 1, 2025, 13 pages.

* cited by examiner

FIG. 6

PACKET DATA CONVERGENCE PROTOCOL DUPLICATION COOPERATIVE CONFIGURED GRANT

BACKGROUND

Ultra-reliable low-latency communications (URLLC) traffic has stringent quality of service (QoS) requirements including short end-to-end delay times and a low packet error-rate. For example, short end-to-end delay times can be achieved by proactive resource allocation, such as configured grant (CG), and low packet error rates can be achieved by packet data convergence protocol (PDCP) duplication.

In general, configured grant allocates a predefined number of physical resource blocks (PRBs) that can be used periodically by a user equipment (UE), user device, mobile device, etc. for uplink data communications, that is, devices can proactively communicate information in predetermined time slots. This approach reduces the data transmission delay for URLLC traffic relative to traditional grant-based allocation, in which the network first obtains a scheduling request indicating that the user has data to transmit, then secondly sends a control signal granting the resources for the uplink data transmission, and thirdly receives the uplink data transmission from the UE.

In some use cases where the integrity of the data needs to be ensured, PDCP duplication can be employed to add more redundancy to the packets being transmitted. The UE in such cases is simultaneously connected to multiple cells. This consumes more energy as the UE has to wake-up for each communication of the same packet.

In general, configured grant and PDCP duplication resources are statically and manually configured by the service operator at the cell level. This often results in inefficient use of the spectrum and/or high energy consumption by the UE.

BRIEF DESCRIPTION OF THE DRAWINGS

The technology described herein is illustrated by way of example and not limited in the accompanying figures in which like reference numerals indicate similar elements and in which:

FIG. 6 is an example data structure of configured grant slot selection based on priority data of user equipment devices, in accordance with various aspects and implementations of the subject disclosure.

DETAILED DESCRIPTION

Various aspects of the technology described herein are generally directed towards cooperative configured grants between multiple neighboring cells serving the same user equipment (UE), user device, mobile device, etc. using packet replica(s) for packet data convergence protocol (PDCP) duplication. In general and as will be understood, the configured grants between neighbor cells are coordinated, based on delay-aware slot selection, to align configured grant slots on the time offset between the original packet version and packet replica(s). Among the benefits, the technology described herein reduces the discontinuous reception (DRX) ON/connected duration for the UE, while also avoiding packet reassembly timeouts. The technology is thus beneficial in many scenarios, including for ultra-reliability, low latency communications (URLLC) device data traffic.

It should be understood that any of the examples herein are non-limiting. Thus, any of the embodiments, aspects, concepts, structures, functionalities or examples described herein are non-limiting, and the technology may be used in various ways that provide benefits and advantages in communications and computing in general. It also should be noted that terms used herein, such as "optimize" or "optimal" and the like (e.g., "maximize," "minimize" and so on) only represent objectives to move towards a more optimal state, rather than necessarily obtaining ideal results.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
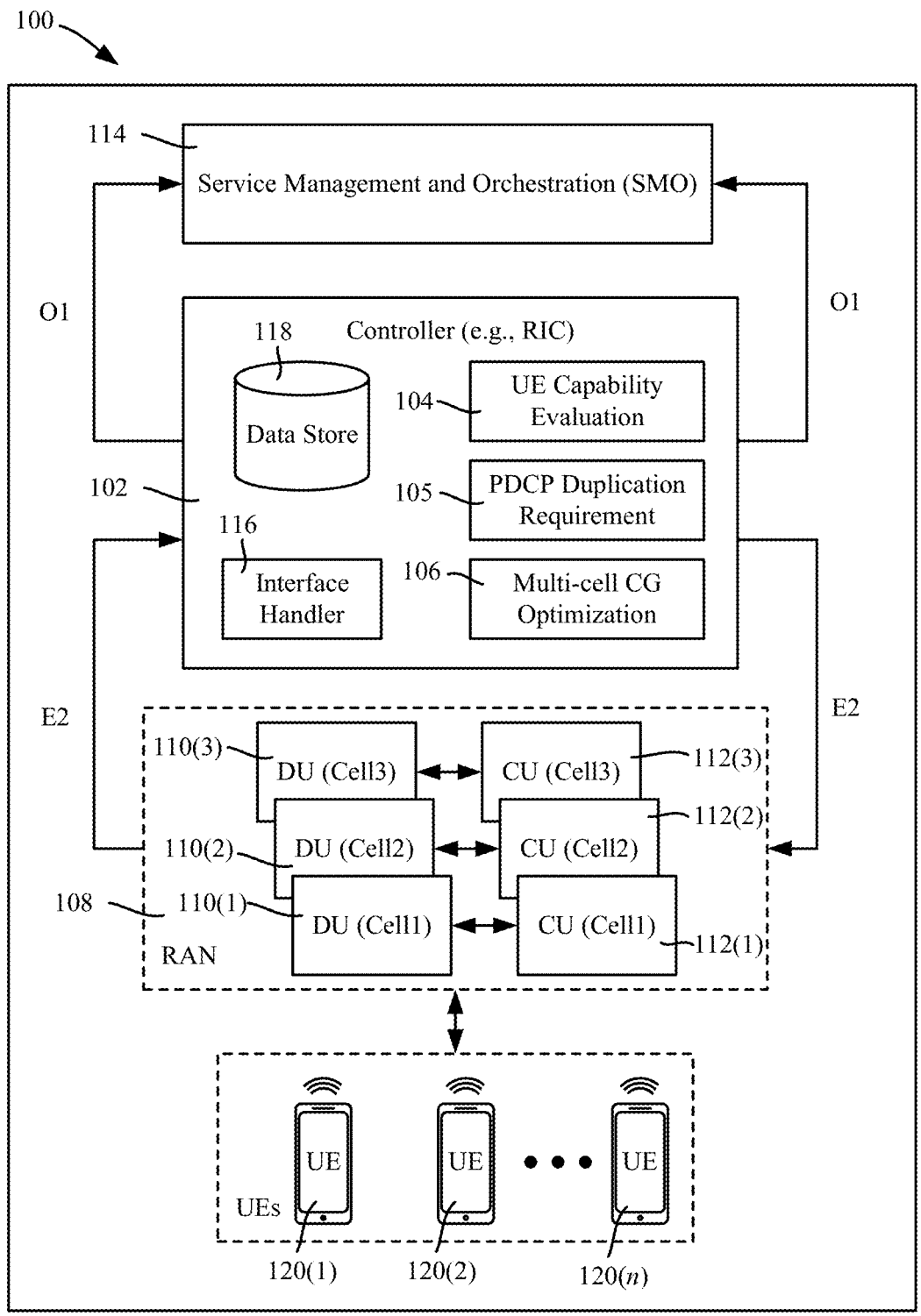
FIG. 1 is a block diagram representation of a system/architecture of example components by which configured grant slots are selected for user equipment devices configured for packet data convergence protocol (PDCP) duplication, in accordance with various aspects and implementations of the subject disclosure.

FIG. 1 shows a system/architecture 100 including a controller component 102 that includes various logic components 104-106 by which configured grant (CG) physical resource blocks (PRBs) are used periodically by UEs for transmitting uplink data. Further, PDCP duplication (corresponding to block 105) can be employed to add more redundancy to packets being transmitted; the UE in such a case is simultaneously connected to multiple cells.

In general, it should be noted that there are a number of tradeoffs with respect to configured grants (CG) and PDCP duplication. Configured grants facilitate reduced delay; (indeed, configuring contiguous resources to the UE would result in minimal delay and energy usage as the UE could go into DRX ON state only for transmission); however, the data is subject to high interference if overlapped (in time) with a neighbor's signal. On the other hand, sporadic resource allocation to achieve diversity will result in high energy consumption at the UE and potentially large delays if the data requires multiple slots for scheduling. Still further, configuring too many configured grant resources (e.g., for URLLC users) will decrease the number of resources that can be allocated to other users (e.g., those without configured grant needs such as mobile broadband users), and thus degrades the spectral efficiency.

Further, in some (e.g., critical) use cases where the integrity of the data needs to be ensured, PDCP duplication using multiple cells can be employed to add more redundancy to the packets being transmitted. The UE in such cases is connected to multiple cells simultaneously and thus consumes more energy, which negatively affects UE battery life, as the UE has to wake-up and handle multiple transmissions of the same packet, including that the UE stays on for longer time durations while waiting for the redundant packet to arrive. There are also issues in which the UE receives one packet, for example, but times out (thereby sending a negative acknowledgment, or NACK) before receiving the other, redundant packet. There are also challenges related to configured grants, in which resources are pre-allocated to minimize latency, but can only be adjusted with signaling overhead. The technology described herein takes these tradeoffs into consideration.

Returning to FIG. 1, as will be understood, the controller component 102 evaluates (block 104) the current UE condition data including its capability data. In general, the UE capability and channel evaluation logic 104 detects user equipment devices that are capable of and eligible for the configured grant feature, along with any PDCP duplication requirements. In one implementation, the UE capability and channel evaluation logic 104 also evaluates user channel condition and connectivity status. The PDCP duplication requirement logic 105 collects manually configured grant slots, and determines time offsets between master cell group (MCG)/secondary cell group (SCG) slots. The multicell configured grant (CG) optimization (block 106) comprises the logic for selecting configured grant slots after alignment between multiple cells, and, as described herein, also can send slot recommendation down to RAN nodes (network DU/CU elements) 108.

More particularly, the example system of FIG. 1 shows the controller 102 coupled via an E2 interface (e.g., in O-RAN compatible scenarios) to three cells (Cell1-Cell3), each cell comprising respective distributed units 110(1)-110(3) and centralized units 112(1)-112(3). As is understood, while only three DU/CU network elements are shown in this simplified example, it is understood that a controller can be coupled to any practical number of elements.

In one implementation in which the system is O-RAN compatible, the controller is coupled via the O1 interface to service management and orchestration (SMO) 114, which handles the orchestration, management, and automation aspects of RAN elements. Also shown in FIG. 1 as part of the controller is an interface handler 116, which allows the controller to receive data from the cooperating cells, and a data store (e.g., database) that is used to store data received over the interface. Data that is maintained can include key performance indicators and allocation data related to the previous window.

In general, the technology described herein can be implemented in a distributed approach using the near real-time RIC (radio access network intelligent controller) and the distributed unit(s). To this end, the near real-time RIC subscribes to the configured grant data and PDCP data provided by the DU(s) and the SMO 114, and aligning the slots accordingly.

Also shown in FIG. 1 are user equipment (UE) devices 120(1)-120(n), communicating via the RAN nodes 108. Such UE devices 120(1)-120(n) can be one type of any number of (e.g., URLLC) devices, including, but not limited to medical-related devices, vehicles, sensors, small measuring devices and so forth, which can be moving at relatively high speeds, e.g., on drones, mobile robots and so forth.

Figure 2A:
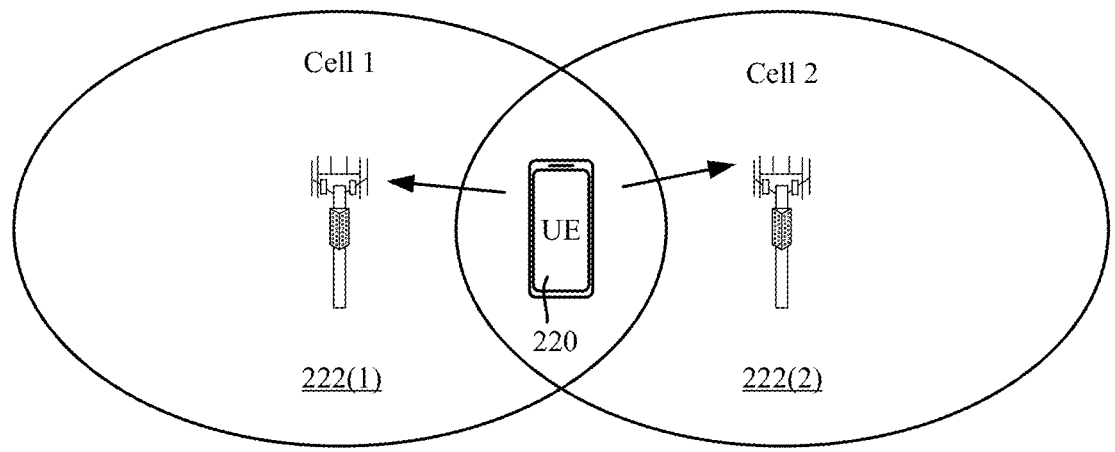
FIG. 2A is an example representation of a user equipment using configured grant resources to reduce latency while being connected simultaneously to two cells for PDCP duplication to increase reliability, in accordance with various aspects and implementations of the subject disclosure.

FIG. 2A shows an example of a URLLC UE 220 using configured grant resources (to minimize latency) and connected simultaneously to Cell 1 222(1) and Cell 2 222(2) for PDCP duplication (to increase reliability). Although the arrows suggest uplink communications, PDCP duplication can increase reliability of downlink communications, including as described herein with reference to FIG. 3.

Figure 2B:
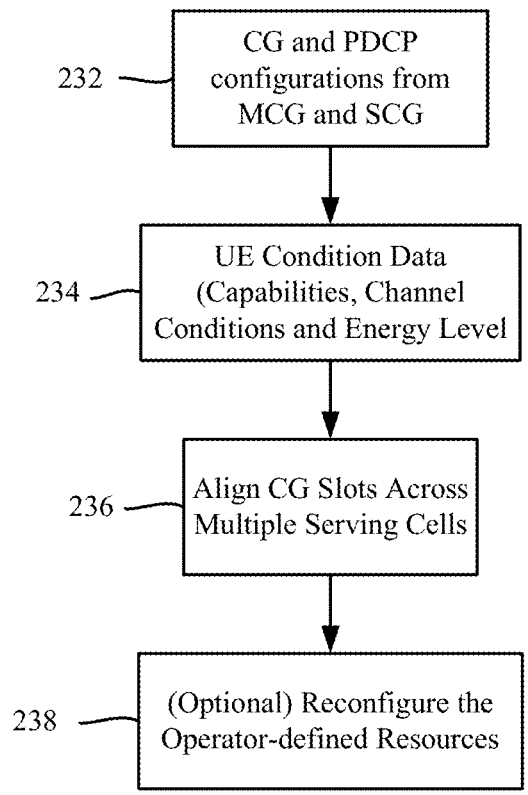
FIG. 2B is an example flow diagram showing example operations related to a cooperative approach in which neighboring cells align on the physical resource blocks and time slots with respect to configured grants, in accordance with various aspects and implementations of the subject disclosure.

As summarized in FIG. 2B, described herein is a cooperative approach in which neighboring cells can align on the PRBs and time slots for configured grant (CG), in order to achieve spatial and time diversity when the user is connected simultaneously to multiple cells, such as master cell group (MCG) and secondary cell group (SCG) dual connectivity. This is generally represented in block 232 of FIG. 2B, and results in higher reliability, without violating packet delay budget, as described with reference to FIG. 3. Further, the technology described herein operates to reduce (e.g., minimize) device energy consumption, where users connected to multiple cells seek to finish their UL data transmissions in a common DRX ON window and then switch to DRX OFF state for minimal power consumption, as generally described with reference to FIG. 4.

In one embodiment, the cooperative and multi-cell alignment between neighboring cells considers the target packet delay of URLLC traffic, including by prioritizing user equipment device(s) in poor radio conditions that need more configured grant resources over other neighboring user equipment devices whose data has higher chance of successful reception from the first transmission attempt. This is based on UE condition data (e.g., capabilities, channel conditions and energy level) as represented in FIG. 2B by block 234.

For backward compatibility (manually configured resources by the service operator), the multicell slot alignment logic 106 (FIG. 1) can prioritize UEs with limited configured grant resources or bad radio conditions. Thus, the technology described herein operates to achieve fairness in energy consumption and packet delay. This is achieved through coordination between the controller 102 hosting the logic and the network management system (e.g., SMO 114) hosting the manual configuration.

Block 236 of FIG. 2B represents MCG/SCG slots alignment across multiple cells. In general and as described herein, this includes making the time offsets shorter to allow for the UEs to have a smaller DRX ON window, thus saving energy. The operator-defined resources can be reconfigured (block 238), as also described herein with reference to FIGS. 8 and 9.

Figure 3:
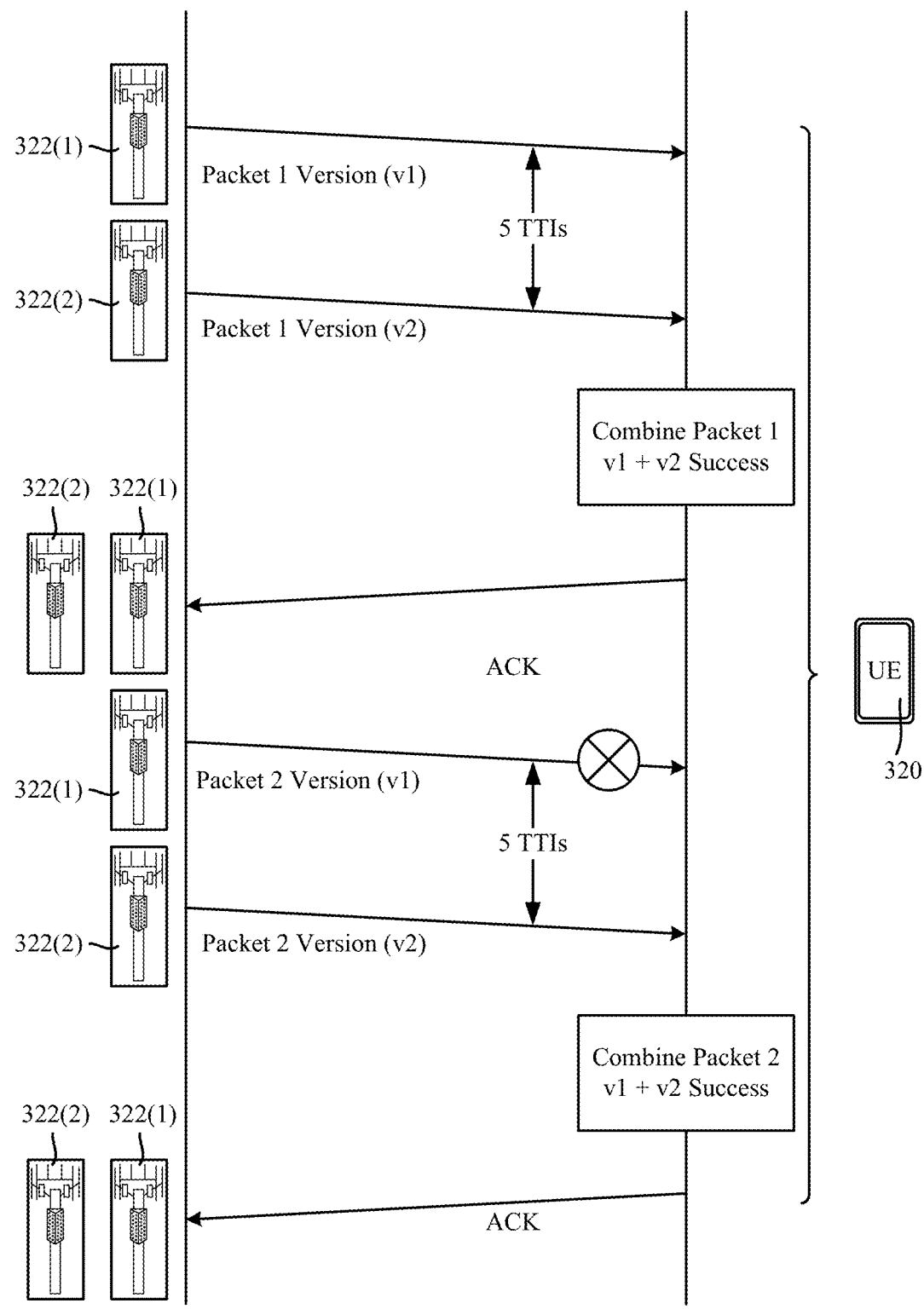
FIG. 3 is an example representation of two cells transmitting PDCP duplication data packets in consecutive configured grant slots before a user equipment can time out, in accordance with various aspects and implementations of the subject disclosure.

FIG. 3 shows a UE 320 with configured grants that are aligned in such a way that both cells 321(1) and 322(2) send in consecutive slots (e.g., five transmission time intervals, or 5 TTIs apart), ensuring the UE 320 ordinarily receives the transmitted data from both cells 321(1) and 322(2) for packet-based reassembly before timing out. The added redundancy gives more robustness to ensure the packet is received. Note that in contrast, current methods of allocating configured grant resources rely on manual and static configuration, in which the operator performs an offline estimation of URLLC traffic load and manually sets the resources dedicated for configured grants. Such resources are statically configured and thus do not reflect the time-varying demand of URLLC traffic and channel conditions. In addition, the operators only consider a per-cell configuration in which the preconfigured resources are selected individually for each cell, which is often suboptimal for multicell scenarios. Currently, PDCP duplication occurs when each cell individually applies slots for the UE to listen, however this approach is flawed as each of the cells are unaware of the other's existence, which may negatively impact the UE's experience. For instance, if the timeslots are too far apart, the UE can time out before receiving both packets, causing needless upper layer retransmissions and delays for the UE. Indeed, if the configured grants of the two cells to the single UE are not aligned closely, the UE will time out after receiving the packet from Cell 1 and send a NACK before receiving the redundant packet from Cell 2.

Figure 4:
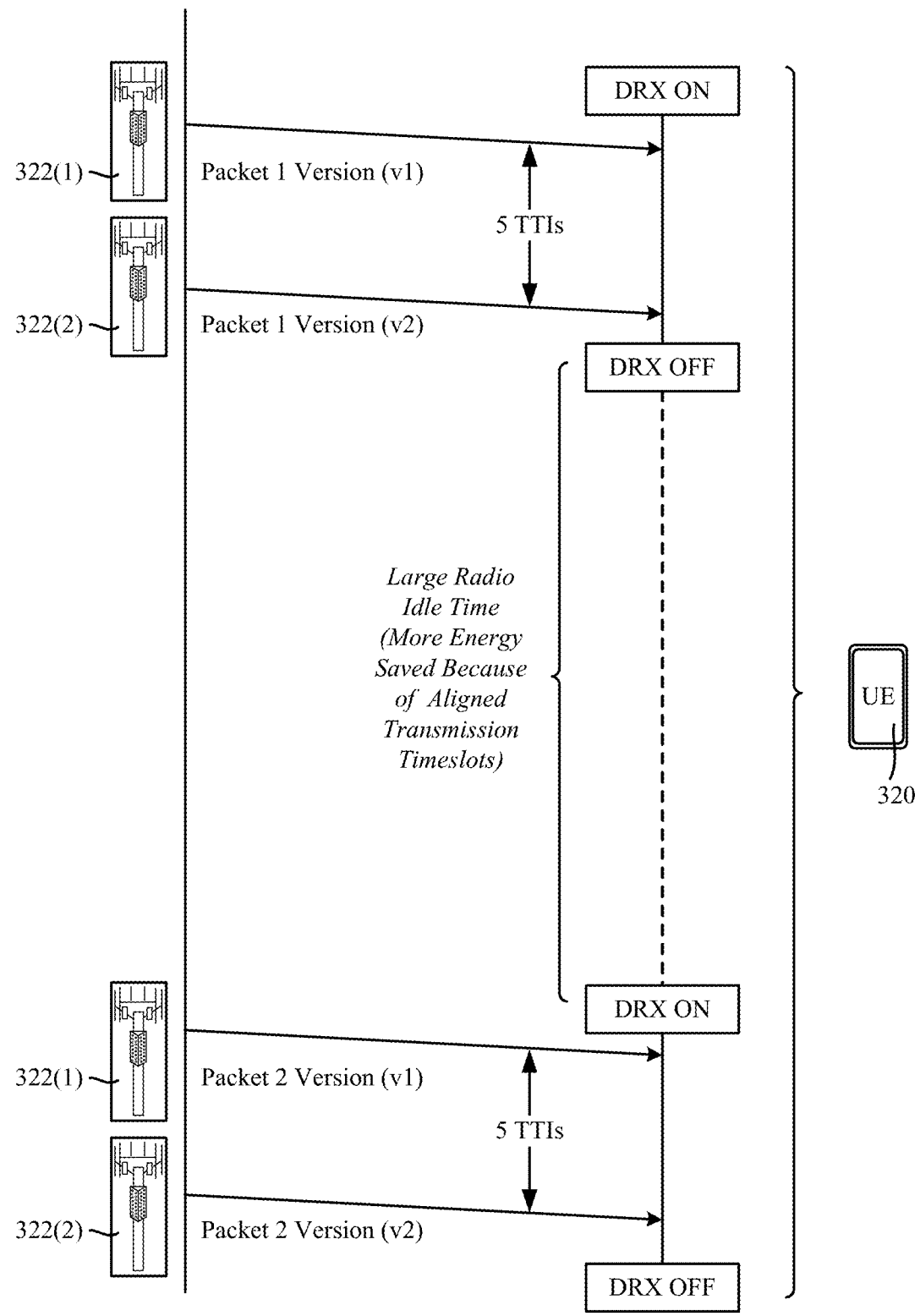
FIG. 4 is an example representation of two cells transmitting PDCP duplication data packets in selected configured grant slots based on saving user equipment energy, in accordance with various aspects and implementations of the subject disclosure.

Another benefit of the technology described herein is shown in FIG. 4, in which the DRX ON state is relatively short because of the transmissions via aligned proximate (e.g., adjacent or very close) slots. When the configured grants are cooperative as described herein, the UE's idle time can be made more optimal to conserve battery life, as the UE stays on for shorter time durations. This is in contrast to limitations of the existing method, in which timeslots of the multiple serving cells may be too apart causing a UE to stay in a DRX ON state for much longer, resulting in larger power consumption; that is, relatively far apart timeslots can negatively affect UE battery life, as the UE stays on for longer time durations while waiting for Cell 2's redundant packet(s) to arrive.

Figure 5:
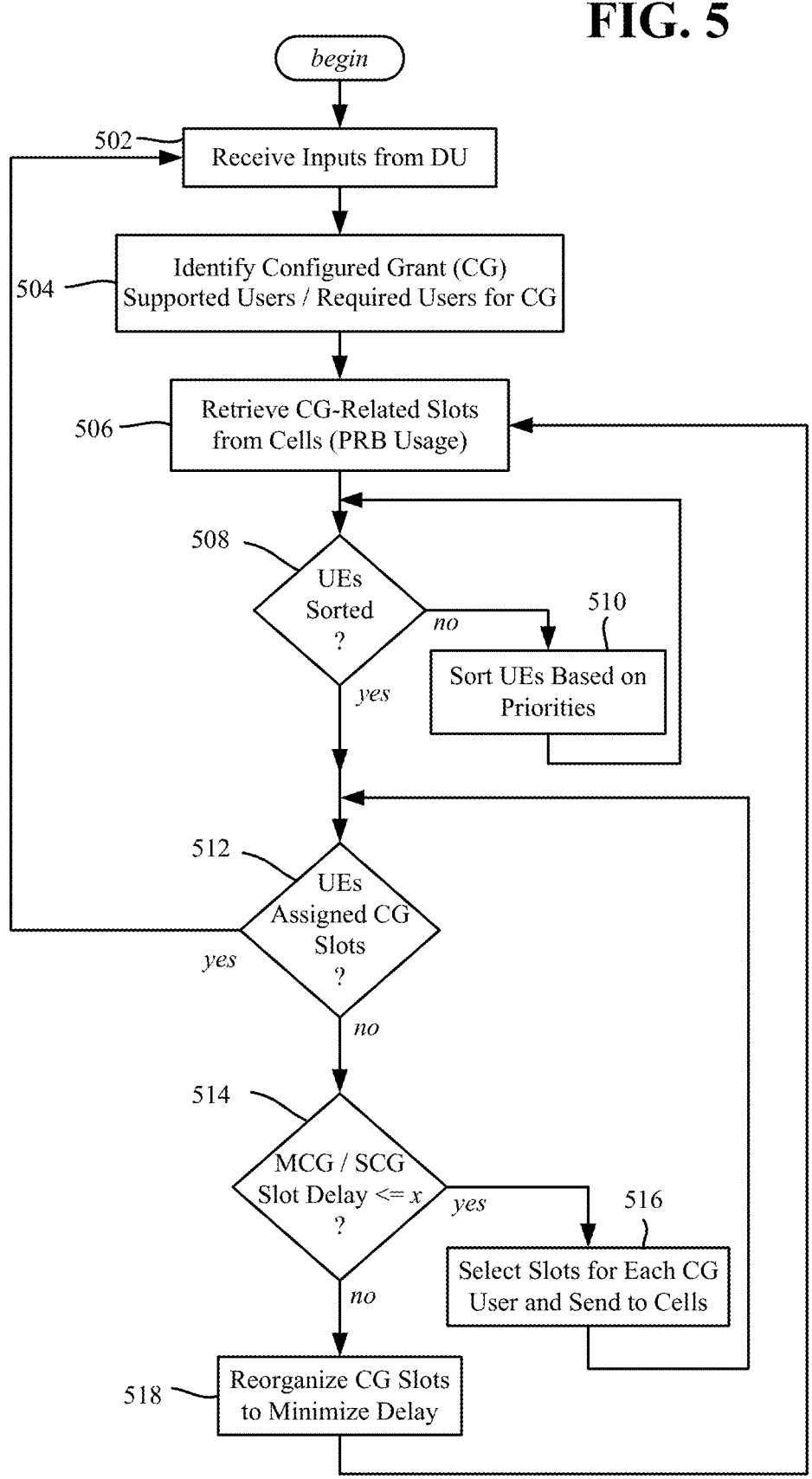
FIG. 5 is an example flow diagram showing example operations related to controller logic assigning configured grants to user equipment based on user condition data, in accordance with various aspects and implementations of the subject disclosure.

FIG. 5 shows example operations that a controller can perform with respect to cooperative configured grants. At operation 502, the controller receives an input list to be processed of condition data for each UE from the scheduler which can include, but is not limited to, a UE capability list (capability data), PDCP delay/packet delay data, buffer status data (how much does the user have in the uplink buffer), channel condition data (e.g., physical uplink shared channel or PUSCH SINR/RSRP, or signal-to-interference noise ratio/reference signal received power), block-error-rate data, power headroom/UE energy level data, and automatic neighbor relation (ANR) data (master cell group/secondary cell group information).

Using this data, as represented at operation 504, the controller identifies which UEs are eligible for configured grants, that is, the controller identifies configured grant-supported user devices/and required user devices for configured grant.

The controller also retrieves (operation 506) cell data containing PRB usage data, which includes the operator's manual configuration (initial configured grant slots) for each cell. Once the eligible/supported user devices have been identified, the PRB s allocated for configured grant for each cell are extracted based on a signal provided by the distributed unit to the controller, or from the operator manual configuration (stored at the SMO).

Based on the information obtained by the controller, as represented by operations 508 and 510 the controller sorts the UEs, based on priority, to assign the configured grants. To this end, using the input data provided, the controller identifies configured grant supported users and filters the ones that will benefit the most from configured grant, such as users with poor radio conditions (low PUSCH SINR), users that support dual connectivity and PDCP duplication (retrieved from the capability list), users with low power headroom/energy level data (reported periodically as part of the control data by the UEs), and/or large packet delay data (identified from the buffer status report in the uplink).

The controller checks if the UEs are sorted based on prior configurations to ensure that users with high priority will get preconfigured grant resources in the case of resource congestion. With respect to sorting, the controller sorts through the UEs to prioritize based on priority, including where priority is based on what can be referred to as "Degrees of Freedom" corresponding to how many different configured grants slots to which a UE has access that fit within the UE's QoS requirements for PDCP duplication.

Figure 6:
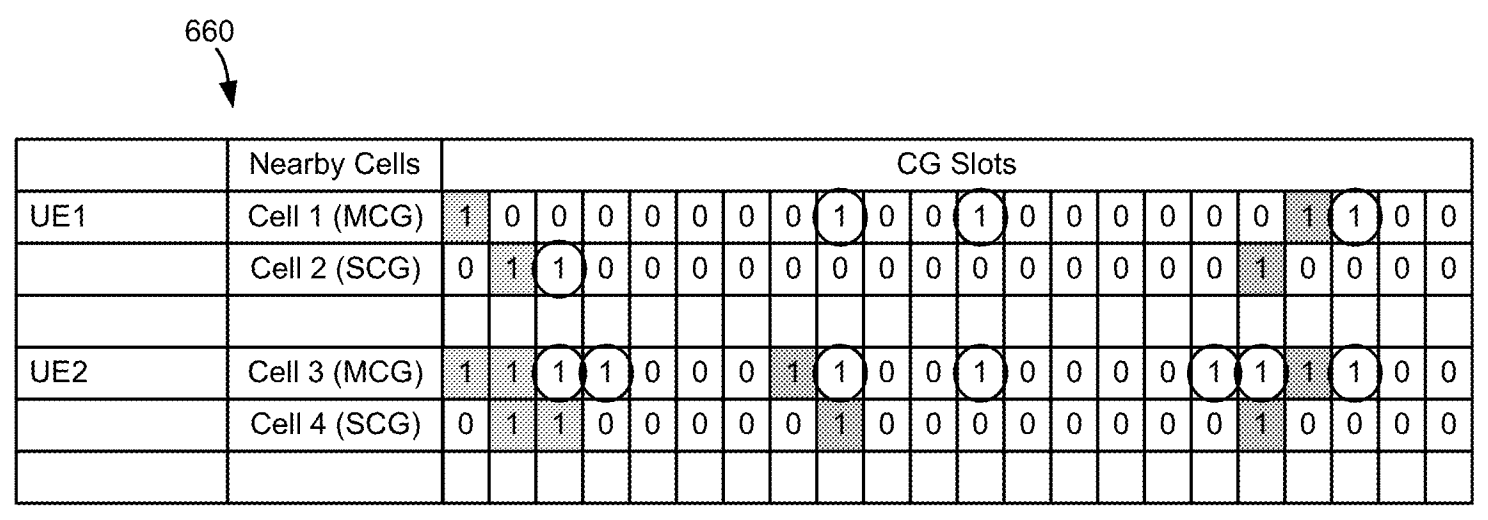

In the example shown in the slot configuration 660 for cells Cell 1-Cell 4 of FIG. 6, the configured grant slots are identified by a "1" in the available configured slots (as opposed to "0" which indicates slots that are not configured grant slots). As can be seen by the shaded blocks, the UE 1 has two degrees of freedom (i.e., slot pairs of two cells that are adjacent in time) that can satisfy UE 1's QoS requirements. The circled slots are available for use as configured slots, but will not satisfy UE 1's QoS requirements with respect to PDCP duplication. As can also be seen in FIG. 6, the UE 2 has four degrees of freedom (i.e., four pairs of adjacent CG slots that can satisfy UE 2's QoS requirements). Thus, because of having less degrees of freedom, UE 1 has higher priority compared to UE 2.

The QoS requirements for the UE include end-to-end PDCP delay, which is based on how far the slots from each cell are from each other, that is, the controller is MCG/SCG delay aware with respect to slot selection. Note that in the example of FIG. 6, the slots are adjacent to one another, however it is understood that the QoS requirements may not be as strict for a given UE, and can be proximate (relatively close in alignment) to one another without necessarily being adjacent each other.

Returning to FIG. 5, once the selected UEs are sorted based on priority, operation 512 checks to determine whether they have been assigned CG slots. If so, operation 512 returns to operation 502 to continue the operations for a new iteration.

If one or more UEs remain unassigned, operation 512 branches to operation 514 to check if the master cell group/secondary cell group slot delay is within a specific defined range, e.g., a delay parameter represented by less than or equal to x. If an unassigned UE's slot MCG/SCG delays are within the specified range, via operation 516 (returning to operation 512), slots are assigned to each UE.

If the operator manual configuration is deemed not satisfactory to meet the UEs' requirements, the controller attempts to modify the PRBs and configured grant reserved slots to reduce (e.g., minimize) UE packet delay. To this end, if any unassigned UE's slot MCG/SCG delay is still outside the specified range, operation 518 reorganizes the configured grant PRB slots for the cells to minimize delay.

The controller 102 (FIG. 1) thus attempts to override the default configuration for configured grant for the cells and sends an update to the SMO 114 to define the new proposed configured grant slots. The SMO 114 can either confirm or reject the proposed configured grant slots, (or possibly send a different set). In case of rejection, the controller reverts the configuration back/retains the previous configuration.

Figure 7:
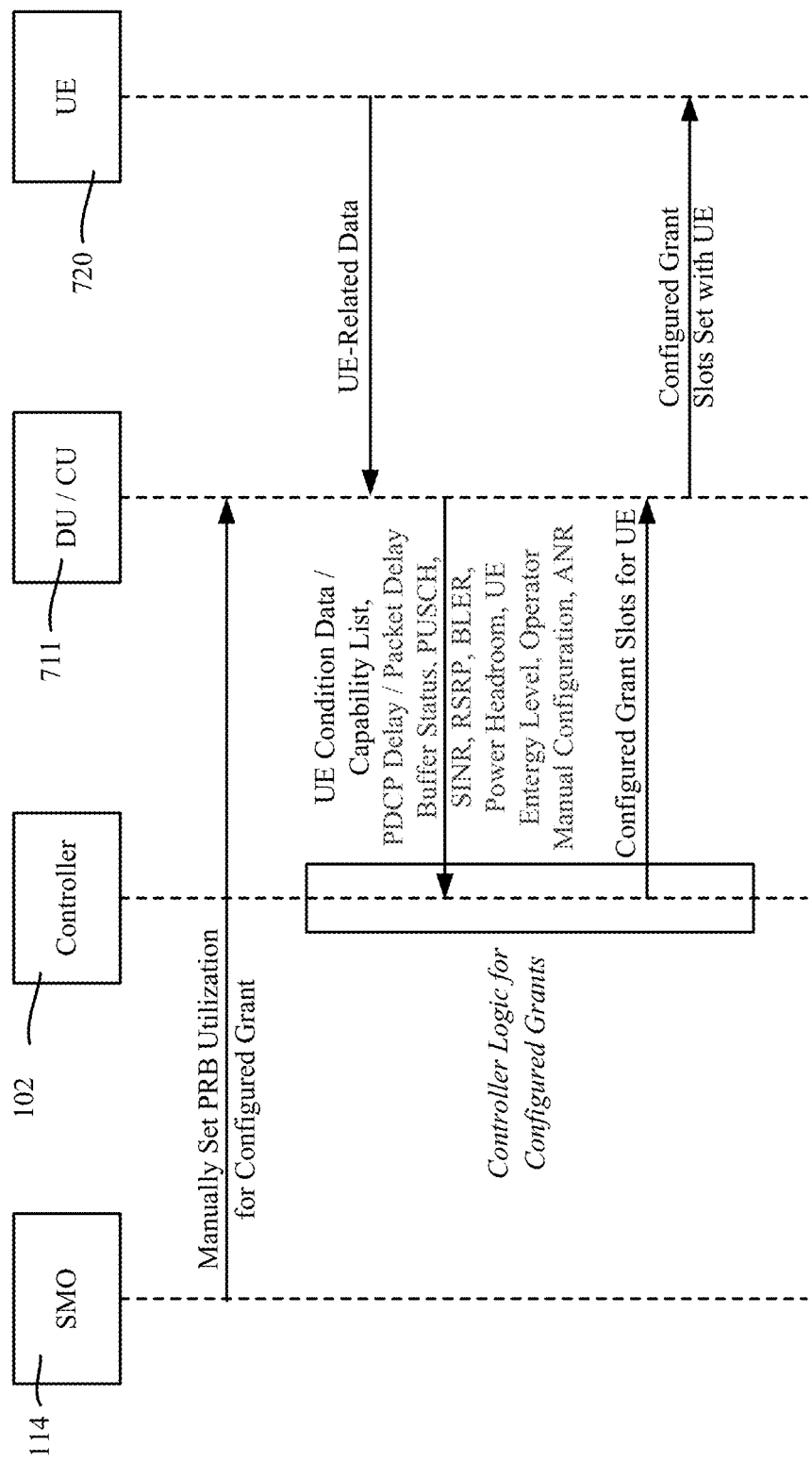
FIG. 7 is an example signaling and dataflow diagram representation in which a controller selects slots for configured grants, without changing the physical resource blocks for the configured grants, in accordance with various aspects and implementations of the subject disclosure.

FIG. 7 is an example signaling/dataflow diagram in which the controller 102 selects slots for configured grant (without attempting to change the PRB for configured grant) for a UE 720. The DU/CU (block 711) obtains the manually set PRB utilization for configured grant, (which the controller also obtains via operation 506 of FIG. 5).

As described herein, the UE 720 sends its condition/capability data to the DU/CU 711, which forwards the data to the controller logic 102, e.g., block 104 of FIG. 1. Based on this data, the controller 102 selects the configured grant slots for the UE 720, and sends them to the DU/CU 711, which in turn sets the configured grant slots with the UE 720.

Figure 8:
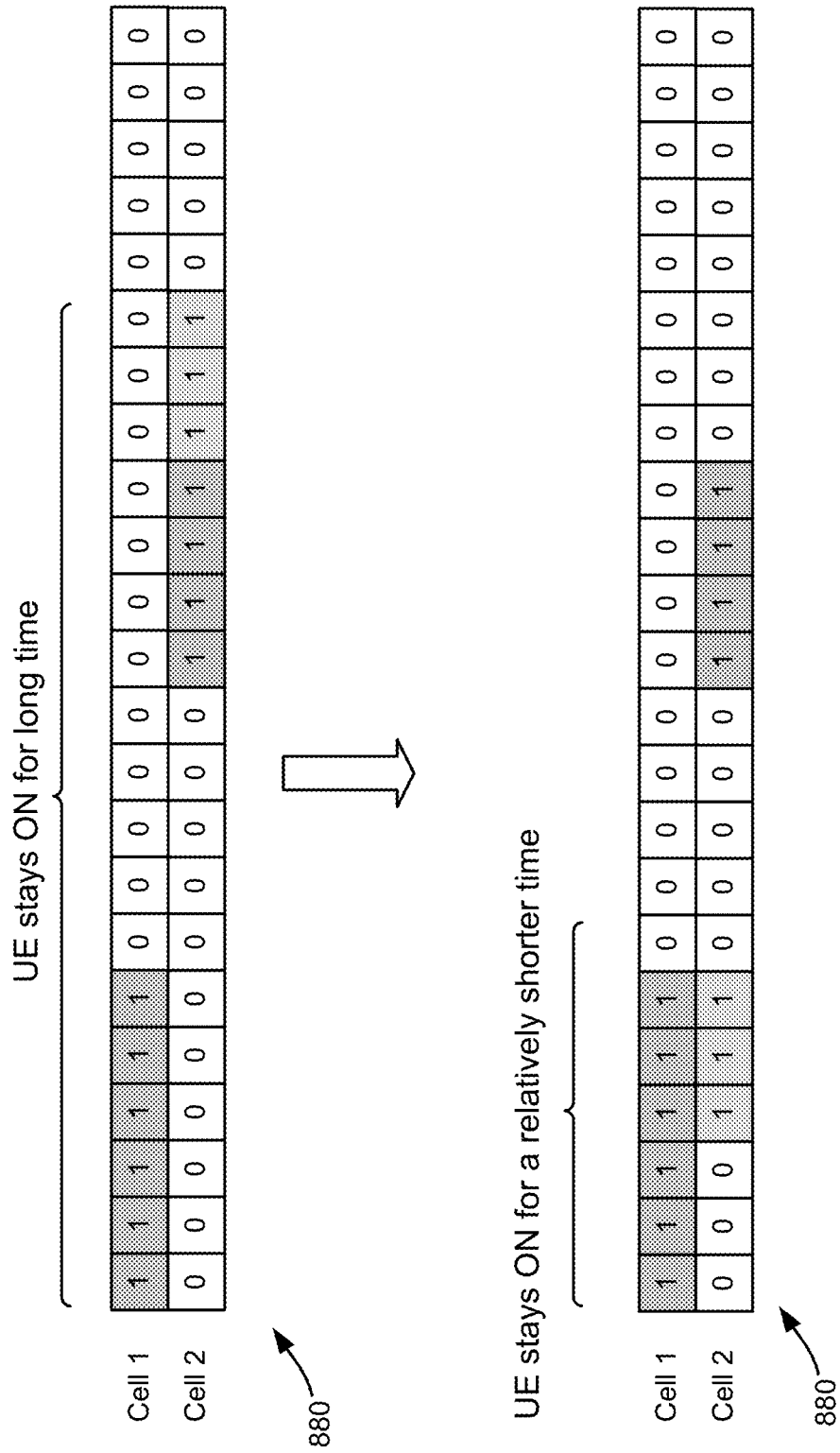
FIG. 8 is an example data structure of default configured grant slots and proposed configured grant slots based on an energy and delay-aware logic, in accordance with various aspects and implementations of the subject disclosure.

FIG. 8 shows a scenario in which the controller determines proposed configured grant slots by the controller, in which (as in FIG. 6) a slot with "1" identifier corresponds to configured grant resources, and "0" otherwise. The controller 102 overrides the default 880 configuration for configured grant for the cells, and sends an update to the SMO 114 to define the new proposed configured grant slot configuration 882. The SMO 114 can either confirm or reject the proposed configured grant slots. In case of rejection, the controller will revert the configuration back.

Figure 9:
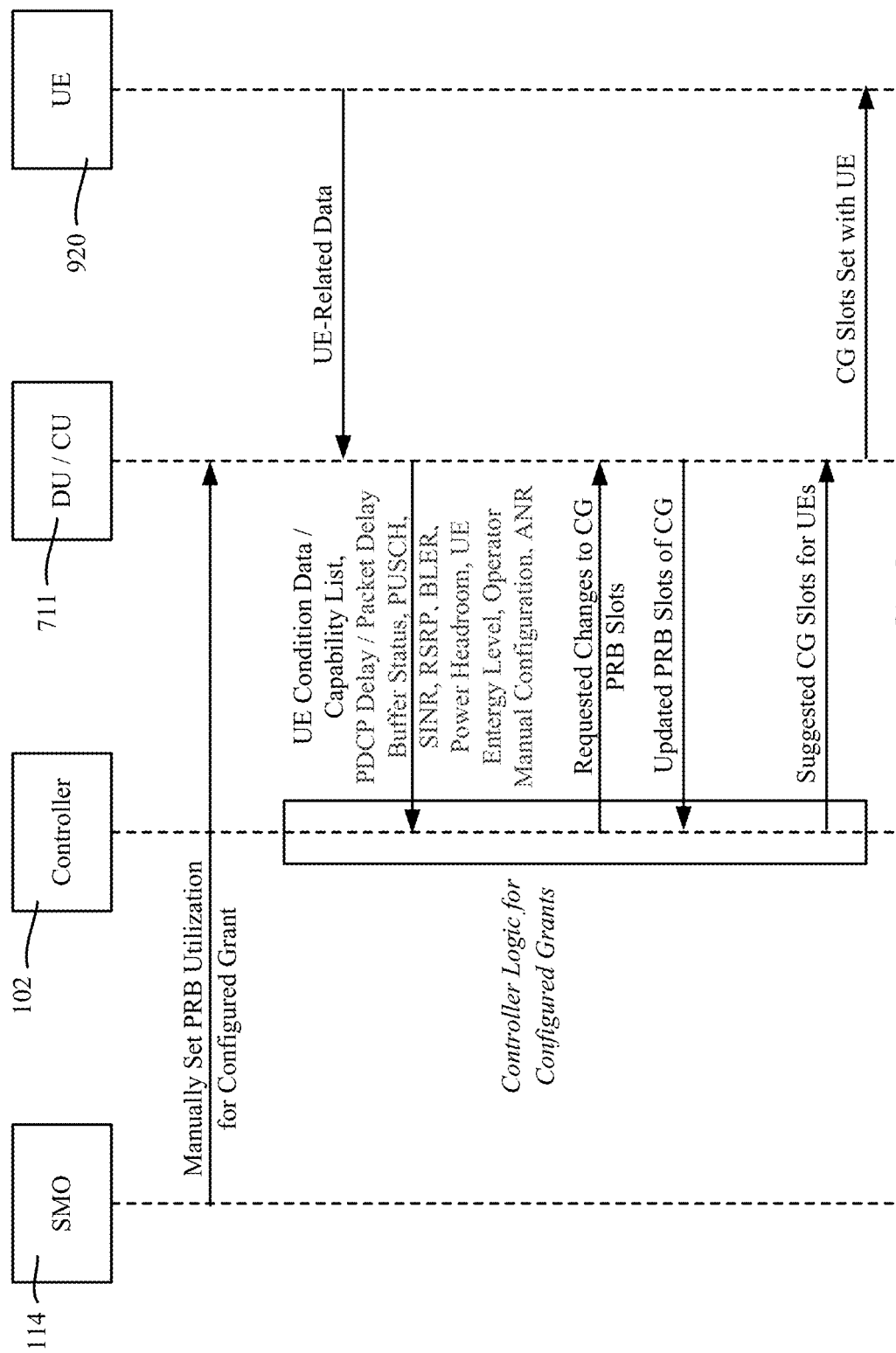
FIG. 9 is an example signaling and dataflow diagram representation in which a controller recommends new physical resource blocks (PRBs) for configured grants slots, in accordance with various aspects and implementations of the subject disclosure.

FIG. 9 is an example signaling/dataflow diagram in which the controller 102 recommends new PRBs for configured grant slots. As in FIG. 7, the default available CG slots are known to the controller, and a UE 920 sends/the controller obtains (from the DU/CU) 711 the UE condition/capability data. Unlike the example of FIG. 7, in FIG. 9 the controller 102 does not choose to use the default slots, and instead sends requested changes to the to the configured grant (CG) slots to the DU/CU 711, receives updated slot data, sends suggested CG slots to the DU/CU 711 for setting with the UE 920. Note that although not explicitly shown if FIG. 9, it is understood that the SMO 114, which is coupled to the DU/CU 711, can be part of the decision as to whether to accept or reject the proposed slots, that is, the deciding entity can be the DU/CU, the SMO, or a combination of both.

Figure 10:
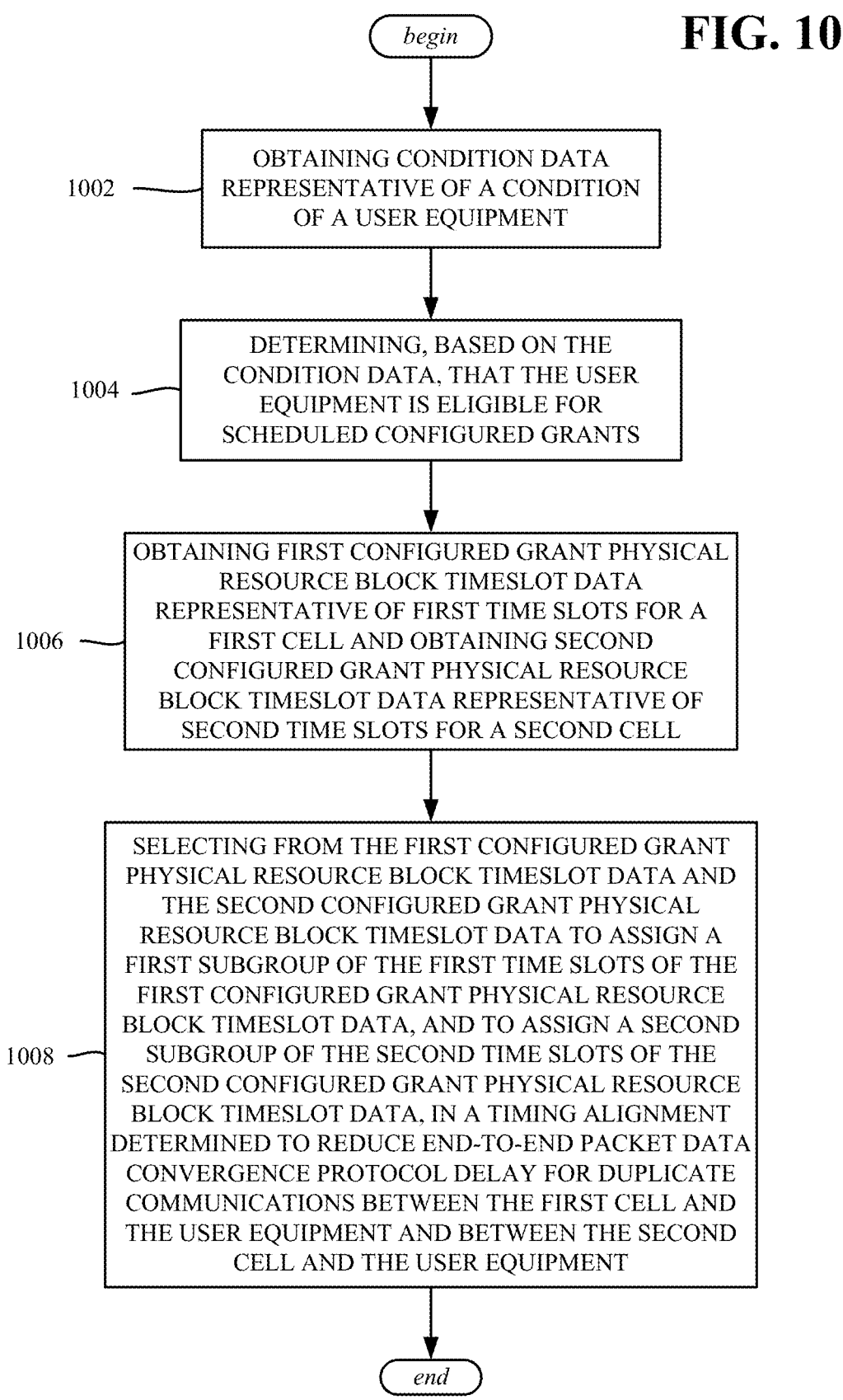
FIG. 10 is a flow diagram showing example operations related to selecting from configured grant PRB timeslot data of cells to reduce end-to-end PDCP delay for duplicate communications, in accordance with various aspects and implementations of the subject disclosure.

One or more aspects can be embodied in network equipment, such as represented in the example operations of FIG. 10, and for example can include a memory that stores computer executable components and/or operations, and a processor that executes computer executable components and/or operations stored in the memory. Example operations can include operation 1002, which represents obtaining condition data representative of a condition of a user equipment. Example operation 1004 represents determining, based on the condition data, that the user equipment is eligible for scheduled configured grants. Example operation 1006 represents obtaining first configured grant physical resource block timeslot data representative of first time slots for a first cell and obtaining second configured grant physical resource block timeslot data representative of second time slots for a second cell. Example operation 1008 represents selecting from the first configured grant physical resource block timeslot data and the second configured grant physical resource block timeslot data to assign a first subgroup of the first time slots of the first configured grant physical resource block timeslot data, and to assign a second subgroup of the second time slots of the second configured grant physical resource block timeslot data, in a timing alignment determined to reduce end-to-end packet data convergence protocol delay for duplicate communications between the first cell and the user equipment and between the second cell and the user equipment. Note that a subgroup can be a single time slot of those available.

The timing alignment can correspond to a first time slot of the first subgroup adjacent to a second time slot of the second subgroup.

Selecting from the first configured grant physical resource block timeslot data and the second configured grant physical resource block timeslot data further can include selecting the first configured grant physical resource block timeslot data and the second configured grant physical resource block timeslot data that have been determined to conserve energy of the user equipment according to an energy conservation function.

The condition data can include at least one of: user equipment capability data representative of a capability of the user equipment, radio condition data representative of a radio condition of a radio associated with the user equipment, packet data convergence protocol delay data representative of a packet data convergence protocol delay associated with the user equipment, packet delay data representative of a packet delay associated with the user equipment, buffer status data representative of a status of a buffer of the user equipment, channel condition data representative of a channel condition of a channel associated with the user equipment, block error rate data representative of a block error rate applicable to transmissions associated with the user equipment, power headroom data representative of an amount of transmission power of the user equipment by which the transmission power is able to be increased, user equipment energy level data representative of an energy level of transmissions associated with the user equipment, or automatic neighbor relation data representative of neighbor relations of network equipment to which the user equipment is able to connect.

The user equipment can include an ultra-reliable low latency communications device.

The network equipment can include a radio access network intelligent controller. Further operations can include requesting, by the radio access network intelligent controller from radio access network elements, changes to at least one of: the first configured grant physical resource block timeslot data or the second configured grant physical resource block timeslot data, obtaining, in response to the requesting, updated configured grant physical resource block timeslot data from the radio access network elements, and sending suggested configured grant physical resource block timeslot data for the user equipment, based on the updated configured grant physical resource block timeslot data, to the radio access network elements.

The user equipment can be a first user equipment, the condition data can include first condition data representative of a first condition of the first user equipment, and further operations can include obtaining second condition data representative of a second condition of a second user equipment, and prioritizing, based on the first condition data and the second condition data, the first user equipment to have a higher priority than the second user equipment with respect to physical resource block time slot assignment. Prioritizing can include determining that the first user equipment has a lesser number of configured grant physical resource block time slots that are able to satisfy a first quality of service specification of the first user equipment relative to a larger number of configured grant physical resource block time slots that are able to satisfy a second quality of service specification of the second user equipment.

The network equipment can include a radio access network intelligent controller, and further operations can include determining, by the radio access network intelligent controller, proposed changes to a default configuration of at least one of: the first configured grant physical resource block timeslot data or the second configured grant physical resource block timeslot data, sending, by the controller based on the proposed changes, proposed configured grant physical resource block timeslot data to a service management and orchestration network element, receiving, in response to the sending, a reply communication to the sending of the proposed configured grant physical resource block timeslot data, in response to the reply communication comprising first information confirming the proposed configured grant physical resource block timeslot data, changing the configured grant physical resource block timeslot data to the proposed configured grant physical resource block timeslot data, and in response to the reply communication comprising second information rejecting the proposed configured grant physical resource block timeslot data, retaining the default configuration of the configured grant physical resource block timeslot data.

Figure 11:
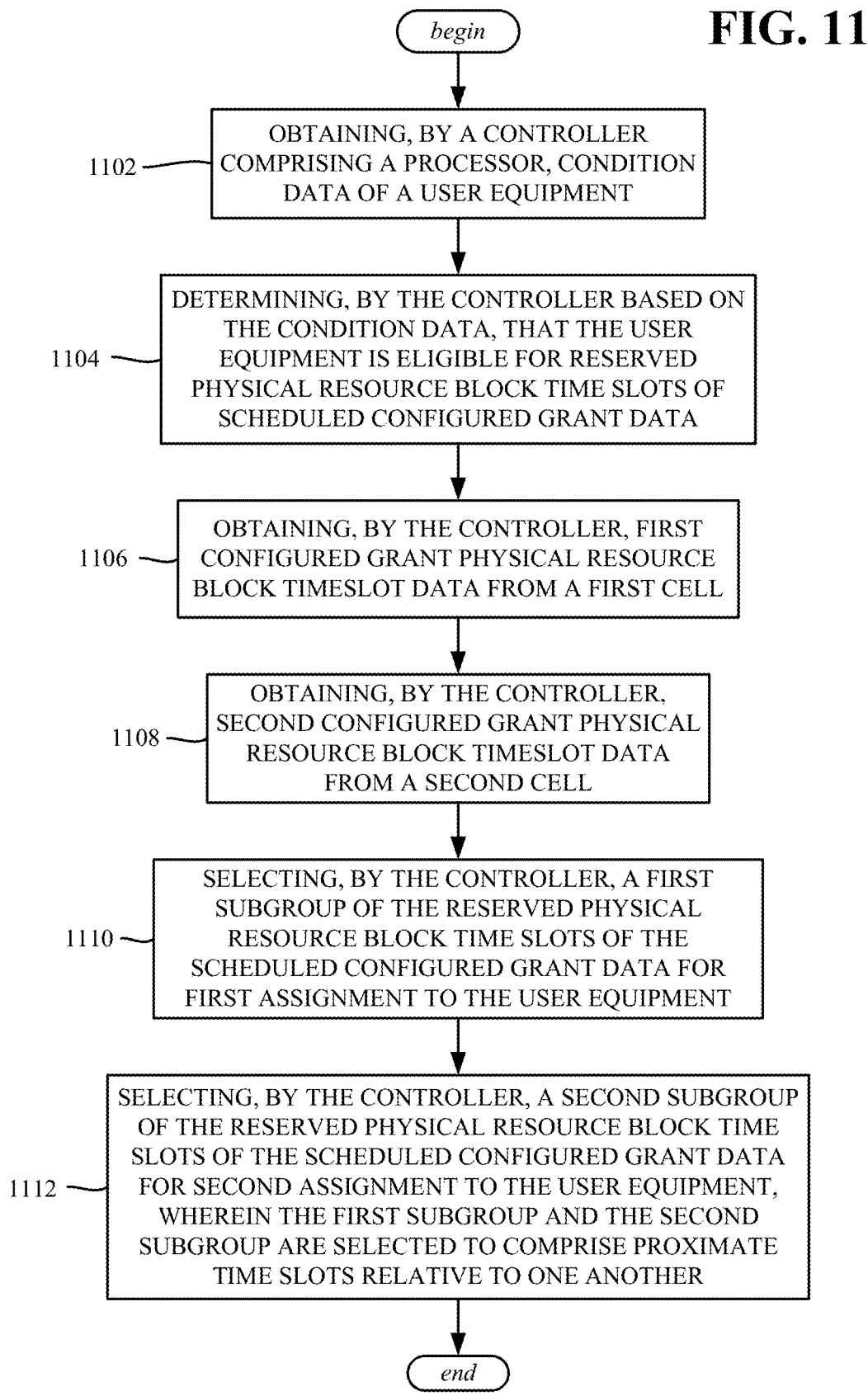
FIG. 11 is a flow diagram showing example operations related to selecting subgroups of cells' reserved PRB proximate time slots of scheduled configured grants for assignment to a user equipment, in accordance with various aspects and implementations of the subject disclosure.

One or more example aspects, such as corresponding to example operations of a method, are represented in FIG. 11. Example operation 1102 represents obtaining, by a controller comprising a processor, condition data of a user equipment. Example operation 1104 represents determining, by the controller based on the condition data, that the user equipment is eligible for reserved physical resource block time slots of scheduled configured grant data. Example operation 1106 represents obtaining, by the controller, first configured grant physical resource block timeslot data from a first cell. Example operation 1108 represents obtaining, by the controller, second configured grant physical resource block timeslot data from a second cell. Example operation 1110 represents selecting, by the controller, a first subgroup of the reserved physical resource block time slots of the scheduled configured grant data for first assignment to the user equipment. Example operation 1112 represents selecting, by the controller, a second subgroup of the reserved physical resource block time slots of the scheduled configured grant data for second assignment to the user equipment, wherein the first subgroup and the second subgroup are selected to comprise proximate time slots relative to one another.

Further operations can include communicating, by the controller, configured grant slot information representing the first subgroup and the second subgroup to a network element to be used in setting configured grant slots with the user equipment.

The condition data can include first condition data, the user equipment can be a first user equipment, the proximate time slots can include first proximate time slots, and further operations can include obtaining, by the controller, second condition data of a second user equipment, determining, by the controller based on the second condition data, that the second user equipment is eligible for reserved physical resource block time slots of the scheduled configured grant data, selecting, by the controller, a third subgroup of the reserved physical resource block time slots of the scheduled configured grant data for third assignment to the second user equipment, and selecting, by the controller, a fourth subgroup of the reserved physical resource block time slots of the scheduled configured grant data for fourth assignment to the second user equipment, wherein the third subgroup and the fourth subgroup are selected to be second proximate time slots relative to one another. Selecting the first subgroup and selecting the second subgroup can be based on prioritizing the first user equipment over the second user equipment.

Further operations can include, in response to determining, by the controller, that master cell group and secondary cell group slot delay data does not satisfy a threshold delay data value with respect to an unassigned user equipment, reorganizing the scheduled configured grant data.

Figure 12:
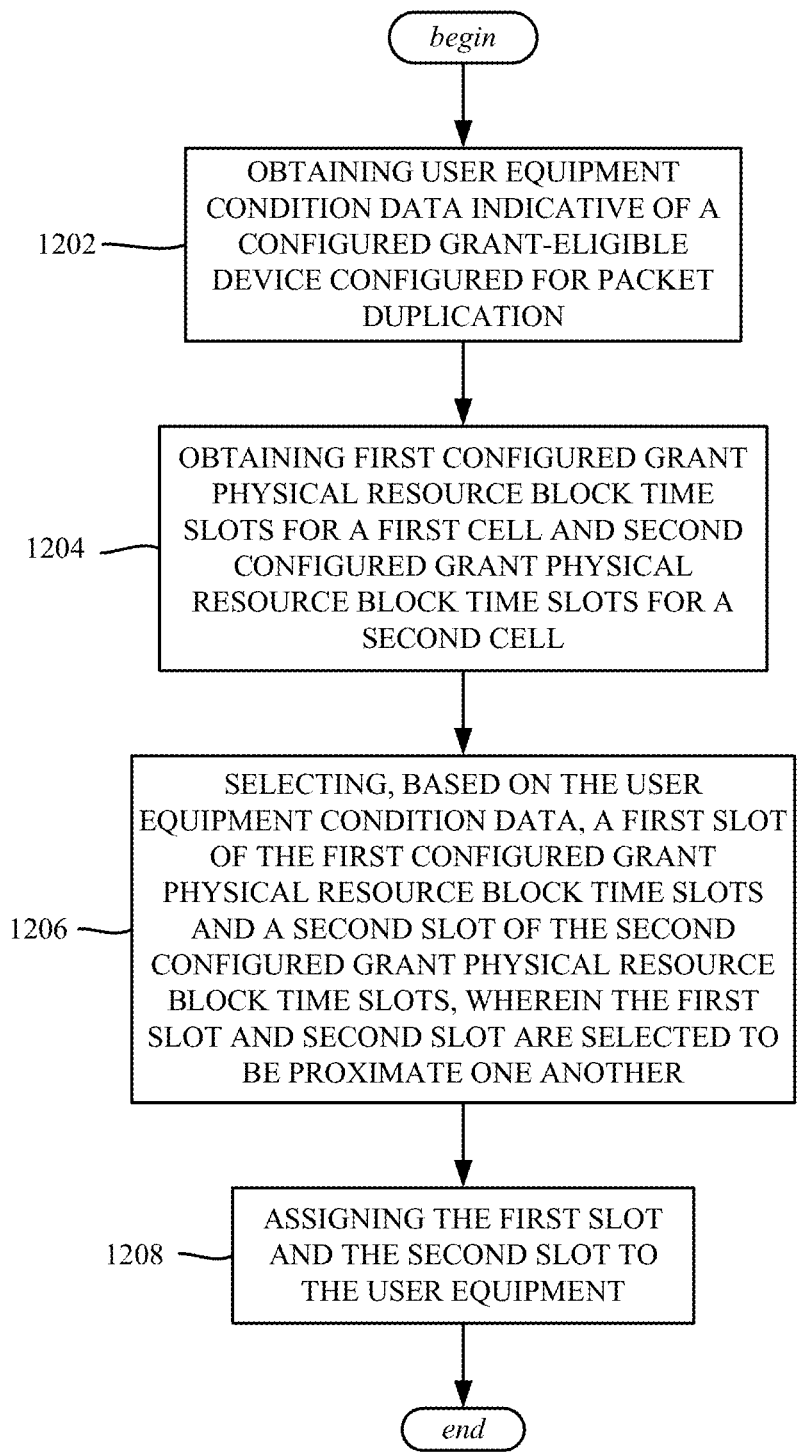
FIG. 12 is a flow diagram showing example operations related to selecting proximate configured grant PRB time slots of cells for assigning to user equipment, in accordance with various aspects and implementations of the subject disclosure.

FIG. 12 summarizes various example operations, e.g., corresponding to a machine-readable medium, comprising executable instructions that, when executed by a processor, facilitate performance of operations. Example operation 1202 represents obtaining user equipment condition data indicative of a configured grant-eligible device configured for packet duplication. Example operation 1204 represents obtaining first configured grant physical resource block time slots for a first cell and second configured grant physical resource block time slots for a second cell. Example operation 1206 represents selecting, based on the user equipment condition data, a first slot of the first configured grant physical resource block time slots and a second slot of the second configured grant physical resource block time slots, wherein the first slot and second slot are selected to be proximate one another. Example operation 1208 represents assigning the first slot and the second slot to the user equipment.

Selecting the first slot and the second slot can include evaluating a time delay between the first slot and the second slot.

Selecting the first slot and the second slot can include selecting adjacent time slots.

The user equipment can be a first user equipment, wherein the condition data can be first condition data, and further operations can include prioritizing the first user equipment higher than a second user equipment with respect to the selecting of the first slot and the second slot; the prioritizing can be based on the first condition data and the second condition data. Obtaining the first configured grant physical resource block time slots can be in response to requesting changes to prior configured grant physical resource block time slots.

As can be seen, the technology described herein facilitates cooperative configured grant between multiple neighboring cells serving the same UE, including to align on the time offset between the original packet version and its replicas. Configuration of slots based on alignment of configured grant slots between multiple cells reduces the DRX ON duration for the UE, and avoids reassembly timeouts.

Figure 13:
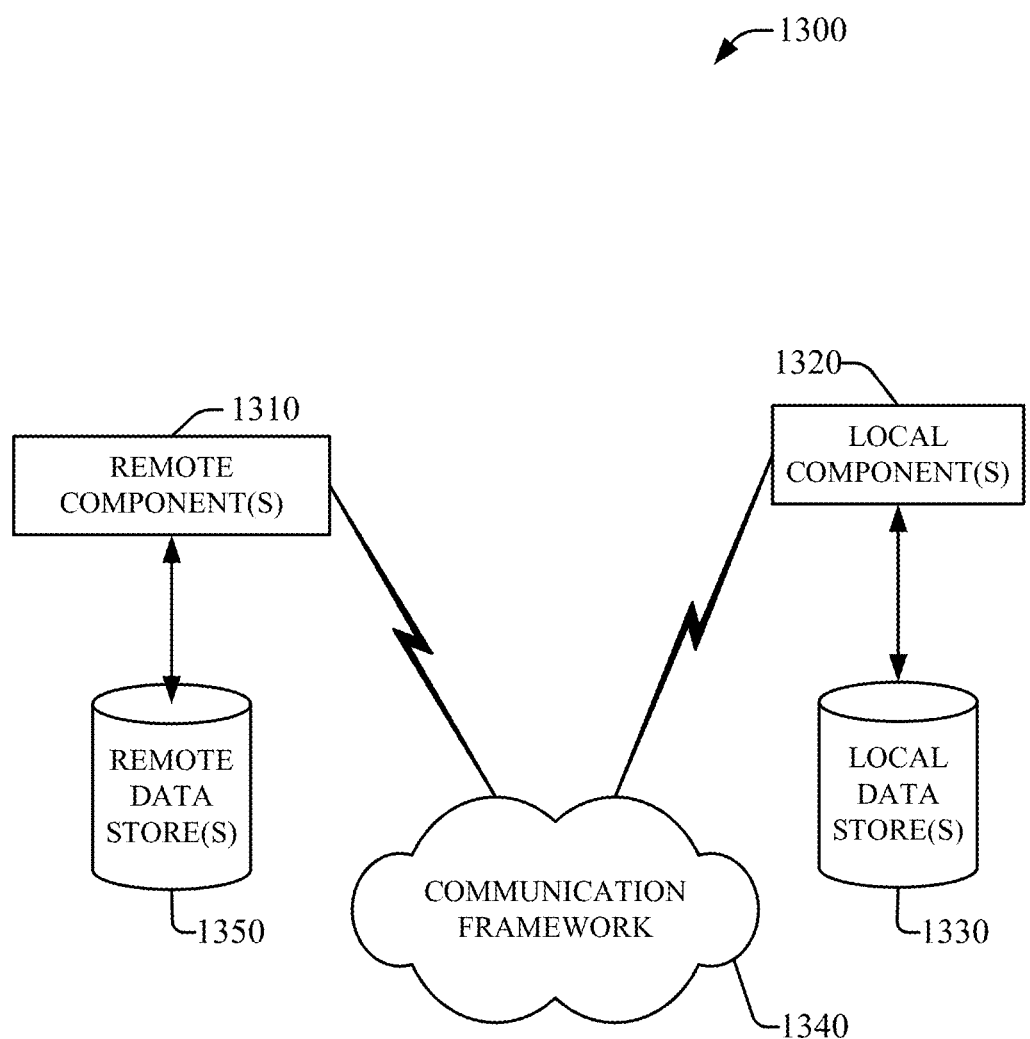
FIG. 13 is a block diagram representing an example computing environment into which aspects of the subject matter described herein may be incorporated.

FIG. 13 is a schematic block diagram of a computing environment 1300 with which the disclosed subject matter can interact. The system 1300 comprises one or more remote component(s) 1310. The remote component(s) 1310 can be hardware and/or software (e.g., threads, processes, computing devices). In some embodiments, remote component(s) 1310 can be a distributed computer system, connected to a local automatic scaling component and/or programs that use the resources of a distributed computer system, via communication framework 1340. Communication framework 1340 can comprise wired network devices, wireless network devices, mobile devices, wearable devices, radio access network devices, gateway devices, femtocell devices, servers, etc.

The system 1300 also comprises one or more local component(s) 1320. The local component(s) 1320 can be hardware and/or software (e.g., threads, processes, computing devices). In some embodiments, local component(s) 1320 can comprise an automatic scaling component and/or programs that communicate/use the remote resources 1310 and 1320, etc., connected to a remotely located distributed computing system via communication framework 1340.

One possible communication between a remote component(s) 1310 and a local component(s) 1320 can be in the form of a data packet adapted to be transmitted between two or more computer processes. Another possible communication between a remote component(s) 1310 and a local component(s) 1320 can be in the form of circuit-switched data adapted to be transmitted between two or more computer processes in radio time slots. The system 1300 comprises a communication framework 1340 that can be employed to facilitate communications between the remote component(s) 1310 and the local component(s) 1320, and can comprise an air interface, e.g., Uu interface of a UMTS network, via a long-term evolution (LTE) network, etc. Remote component(s) 1310 can be operably connected to one or more remote data store(s) 1350, such as a hard drive, solid state drive, SIM card, device memory, etc., that can be employed to store information on the remote component(s) 1310 side of communication framework 1340. Similarly, local component(s) 1320 can be operably connected to one or more local data store(s) 1330, that can be employed to store information on the local component(s) 1320 side of communication framework 1340.

Figure 14:
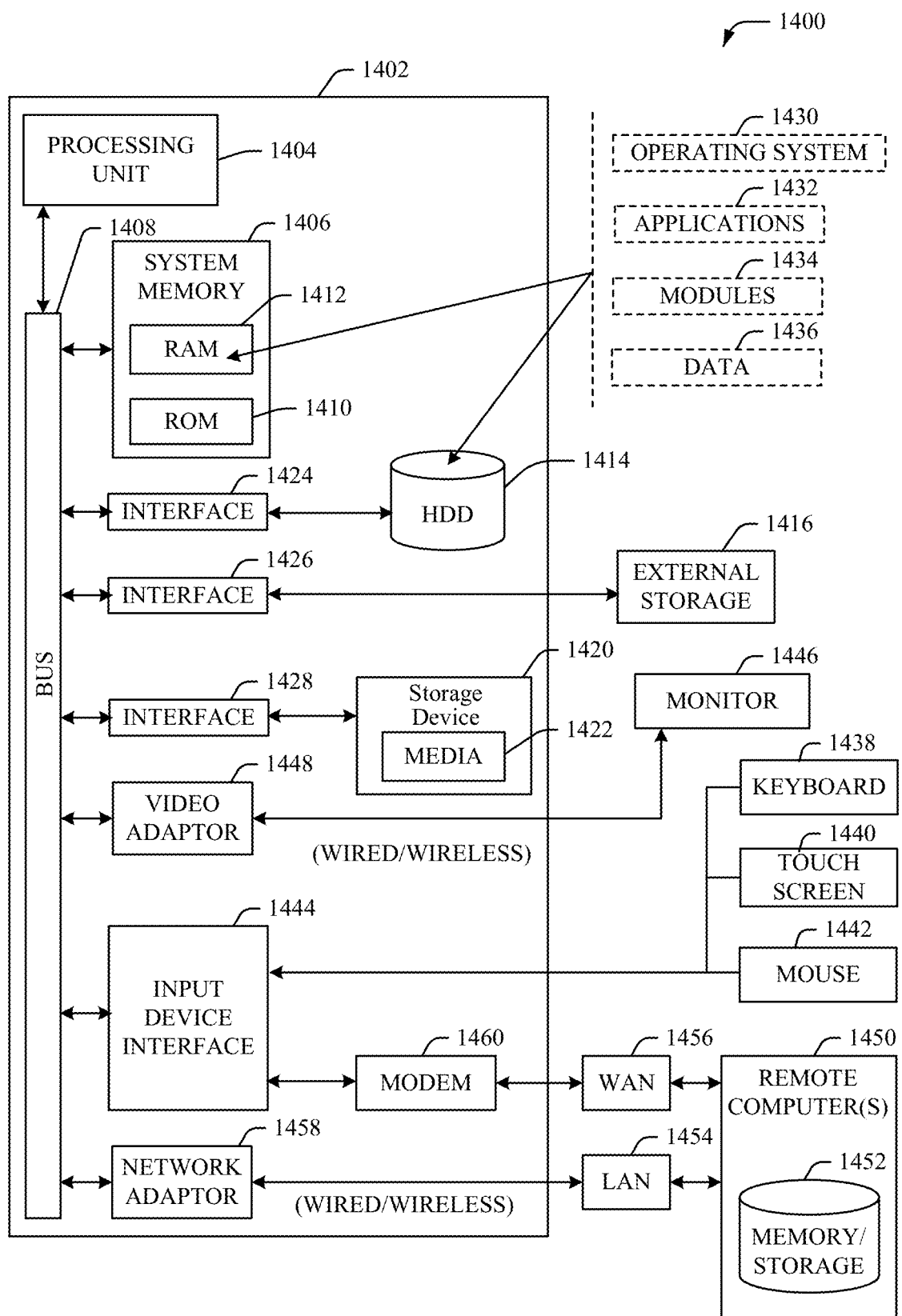
FIG. 14 depicts an example schematic block diagram of a computing environment with which the disclosed subject matter can interact/be implemented at least in part, in accordance with various aspects and implementations of the subject disclosure.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), and can include one or more external storage devices 1416 (e.g., a magnetic floppy disk drive (FDD) 1416, a memory stick or flash drive reader, a memory card reader, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414.

Other internal or external storage can include at least one other storage device 1420 with storage media 1422 (e.g., a solid state storage device, a nonvolatile memory device, and/or an optical disk drive that can read or write from removable media such as a CD-ROM disc, a DVD, a BD, etc.). The external storage 1416 can be facilitated by a network virtual machine. The HDD 1414, external storage device(s) 1416 and storage device (e.g., drive) 1420 can be connected to the system bus 1408 by an HDD interface 1424, an external storage interface 1426 and a drive interface 1428, respectively.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1494 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations.

That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. Network equipment, comprising:
   at least one processor; and
   at least one memory that stores executable instructions that, when executed by the at least one processor, facilitate performance of operations, the operations comprising:
   obtaining condition data representative of a condition of a user equipment, wherein the condition data comprises automatic neighbor relation data representative of neighbor relations of network equipment to which the user equipment is able to connect;
   determining, based on the condition data, that the user equipment is eligible for scheduled configured grants;
   obtaining first configured grant physical resource block timeslot data representative of first time slots for a first cell and obtaining second configured grant physical resource block timeslot data representative of second time slots for a second cell; and
   selecting from the first configured grant physical resource block timeslot data and the second configured grant physical resource block timeslot data to assign a first subgroup of the first time slots of the first configured grant physical resource block timeslot data, and to assign a second subgroup of the second time slots of the second configured grant physical resource block timeslot data, in a timing alignment, wherein the timing alignment is determined to reduce end-to-end packet data convergence protocol delay for duplicate communications between the first cell and the user equipment and between the second cell and the user equipment.

2. The network equipment of claim 1, wherein the timing alignment corresponds to a first time slot of the first subgroup adjacent to a second time slot of the second subgroup.

3. The network equipment of claim 1, wherein the selecting from the first configured grant physical resource block timeslot data and the second configured grant physical resource block timeslot data further comprises selecting the first configured grant physical resource block timeslot data and the second configured grant physical resource block timeslot data that have been determined to conserve energy of the user equipment according to an energy conservation function.

4. The network equipment of claim 1, wherein the condition data comprises at least one of: user equipment capability data representative of a capability of the user equipment, radio condition data representative of a radio condition of a radio channel associated with the user equipment, packet data convergence protocol delay data representative of a packet data convergence protocol delay associated with the user equipment, packet delay data representative of a packet delay associated with the user equipment, buffer status data representative of a status of a buffer of the user equipment, channel condition data representative of a channel condition of a channel associated with the user equipment, block error rate data representative of a block error rate applicable to transmissions associated with the user equipment, power headroom data representative of an amount of transmission power of the user equipment by which the transmission power is able to be increased, or user equipment energy level data representative of an energy level of transmissions associated with the user equipment.

5. The network equipment of claim 1, wherein the user equipment comprises an ultra-reliable low latency communications device.

6. The network equipment of claim 1, wherein the network equipment comprises a radio access network intelligent controller.

7. The network equipment of claim 6, wherein the operations further comprise requesting, by the radio access network intelligent controller from radio access network elements, changes to at least one of: the first configured grant physical resource block timeslot data or the second configured grant physical resource block timeslot data, obtaining, in response to the requesting, updated configured grant physical resource block timeslot data from the radio access network elements, and sending suggested configured grant physical resource block timeslot data for the user equipment, based on the updated configured grant physical resource block timeslot data, to the radio access network elements.

8. The network equipment of claim 1, wherein the user equipment is a first user equipment, wherein the condition data comprises first condition data representative of a first condition of the first user equipment, and wherein the operations further comprise obtaining second condition data representative of a second condition of a second user equipment, and prioritizing, based on the first condition data and the second condition data, the first user equipment to have a higher priority than the second user equipment with respect to physical resource block time slot assignment.

9. The network equipment of claim 8, wherein the prioritizing comprises determining that the first user equipment has a lesser number of configured grant physical resource block time slots that are able to satisfy a first quality of service specification of the first user equipment relative to a larger number of configured grant physical resource block time slots that are able to satisfy a second quality of service specification of the second user equipment.

10. The network equipment of claim 1, wherein the network equipment comprises a radio access network intelligent controller, and wherein the operations further comprise:
   determining, by the radio access network intelligent controller, proposed changes to a default configuration of at least one of: the first configured grant physical resource block timeslot data or the second configured grant physical resource block timeslot data, sending, by the radio access network intelligent controller based on the proposed changes, proposed configured grant physical resource block timeslot data to a service management and orchestration network element, receiving, by the radio access network intelligent controller in response to the sending, a reply communication to the sending of the proposed configured grant physical resource block timeslot data, in response to the reply communication comprising first information confirming the proposed configured grant physical resource block timeslot data, changing, by the radio access network intelligent controller, the configured grant physical resource block timeslot data to the proposed configured grant physical resource block timeslot data, and in response to the reply communication comprising second information rejecting the proposed configured grant physical resource block timeslot data, retaining, by the radio access network intelligent controller, the default configuration of the configured grant physical resource block timeslot data.

11. A method, comprising:

obtaining, by a controller comprising at least one processor, condition data of a user equipment, wherein the condition data comprises automatic neighbor relation data representative of neighbor relations of network equipment to which the user equipment is able to connect;

determining, by the controller based on the condition data, that the user equipment is eligible for reserved physical resource block time slots of scheduled configured grant data;

obtaining, by the controller, first configured grant physical resource block timeslot data from a first cell;

obtaining, by the controller, second configured grant physical resource block timeslot data from a second cell;

selecting, by the controller, a first subgroup of the reserved physical resource block time slots of the scheduled configured grant data for first assignment to the user equipment; and selecting, by the controller, a second subgroup of the reserved physical resource block time slots of the scheduled configured grant data for second assignment to the user equipment, wherein the first subgroup and the second subgroup are selected to comprise proximate time slots relative to one another.

12. The method of claim 11, further comprising communicating, by the controller, configured grant slot information representing the first subgroup and the second subgroup to a network element to be used in setting configured grant slots with the user equipment.

13. The method of claim 11, wherein the condition data comprises first condition data, wherein the user equipment is a first user equipment, wherein the proximate time slots are first proximate time slots, and further comprising:

obtaining, by the controller, second condition data of a second user equipment;

determining, by the controller based on the second condition data, that the second user equipment is eligible for reserved physical resource block time slots of the scheduled configured grant data;

selecting, by the controller, a third subgroup of the reserved physical resource block time slots of the scheduled configured grant data for third assignment to the second user equipment; and selecting, by the controller, a fourth subgroup of the reserved physical resource block time slots of the scheduled configured grant data for fourth assignment to the second user equipment, wherein the third subgroup and the fourth subgroup are selected to be second proximate time slots relative to one another.

14. The method of claim 13, wherein the selecting of the first subgroup and the selecting of the second subgroup is based on prioritizing the first user equipment over the second user equipment.

15. The method of claim 11, further comprising:

in response to determining, by the controller, that master cell group and secondary cell group slot delay data does not satisfy a threshold delay data value with respect to an unassigned user equipment, reorganizing the scheduled configured grant data.

16. A non-transitory machine-readable medium, comprising executable instructions that, when executed by at least one processor, facilitate performance of operations, the operations comprising:

obtaining user equipment condition data indicative of a configured grant-eligible device configured for packet duplication, wherein the user equipment condition data comprises automatic neighbor relation data representative of neighbor relations of network equipment to which user equipment is able to connect;

obtaining first configured grant physical resource block time slots for a first cell and second configured grant physical resource block time slots for a second cell;

selecting, based on the user equipment condition data, a first slot of the first configured grant physical resource block time slots and a second slot of the second configured grant physical resource block time slots, wherein the first slot and second slot are selected to be proximate to one another; and assigning the first slot and the second slot to the user equipment.

17. The non-transitory machine-readable medium of claim 16, wherein the selecting of the first slot and the second slot comprises evaluating a time delay between the first slot and the second slot.

18. The non-transitory machine-readable medium of claim 16, wherein the selecting of the first slot and the second slot comprises selecting adjacent time slots.

19. The non-transitory machine-readable medium of claim 16, wherein the user equipment is a first user equipment, wherein the condition data is first condition data, and wherein the operations further comprise prioritizing the first user equipment higher than a second user equipment with respect to the selecting of the first slot and the second slot, wherein the prioritizing is based on the first condition data and the second condition data.

20. The non-transitory machine-readable medium of claim 19, wherein the obtaining of the first configured grant physical resource block time slots is in response to requesting changes to prior configured grant physical resource block time slots.

* * * * *